US007475071B1

(12) United States Patent
Liu et al.

(10) Patent No.: US 7,475,071 B1
(45) Date of Patent: Jan. 6, 2009

(54) PERFORMING A PARALLEL NEAREST-NEIGHBOR MATCHING OPERATION USING A PARALLEL HYBRID SPILL TREE

(75) Inventors: Ting Liu, Pittsburgh, PA (US); Charles J. Rosenberg, Palo Alto, CA (US); Henry A. Rowley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 11/346,080

(22) Filed: Feb. 1, 2006

Related U.S. Application Data

(60) Provisional application No. 60/735,617, filed on Nov. 12, 2005.

(51) Int. Cl.
*G06F 17/30* (2006.01)
(52) U.S. Cl. .............................................. 707/6; 707/5
(58) Field of Classification Search .................. 707/6, 707/3, 5, 7
See application file for complete search history.

(56) References Cited

U.S. PATENT DOCUMENTS 5,895,470 A * 4/1999 Pirolli et al. .................... 707/6
6,070,158 A * 5/2000 Kirsch et al. .................... 707/5
6,704,719 B1 * 3/2004 Ericson ............... 707/E17.012
2006/0074907 A1 * 4/2006 Singhal et al. .................. 707/6

OTHER PUBLICATIONS

Publication: "An Investigation of Practical Approximate Nearest Neighbor Algorithms", Liu et al., Advances in Neural Information Processing Systems (NIPS) 2004.
Publication: "Nearest-Neighbor Searching and Metric Space Dimensions", K.L. Clarkson, to appear in Nearest-Neighbor Methods for Learning and Vision: Theory and Practice, editors Darrell et al. Previous Version Apr. 2005, Original Feb. 21, 2005.
Publication: "Mapreduce: Simplified Data Processing on Large Clusters", J. Dean and S. Ghemawat, Symposium on Operating System Design and Implementation (OSDI 2004), San Francisco, CA, Dec. 2004.

* cited by examiner

*Primary Examiner*—Etienne P LeRoux
*Assistant Examiner*—Thuy (Tiffany) Bui
(74) *Attorney, Agent, or Firm*—Park, Vaughan & Fleming LLP

(57) ABSTRACT

One embodiment of the present invention provides a method and a system for performing a nearest-neighbor matching operation using a parallel hybrid spill tree. During operation, the system receives an object to be compared to a set of objects stored in the parallel hybrid spill tree. The system first searches a "top tree" of the parallel hybrid spill tree to identify a partition that is likely to contain a nearest neighbor of the object. Each node in the top tree defines an associated partition for the parallel hybrid spill tree. The system then searches a "leaf sub-tree" of the parallel hybrid spill tree that corresponds to the associated partition in an attempt to identify the nearest neighbor of the object.

20 Claims, 7 Drawing Sheets

FIG. 1A  FIG. 1B

PERFORMING A PARALLEL NEAREST-NEIGHBOR MATCHING OPERATION USING A PARALLEL HYBRID SPILL TREE

RELATED APPLICATION

The subject matter of this application is related to the subject matter in a co-pending non-provisional application by the same inventors as the instant application and filed on the same day as the instant application entitled, "Building Parallel Hybrid Spill Trees to Facilitate Parallel Nearest-Neighbor Matching Operations," having Ser. No. 11/346,022, and filing date Feb. 1, 2006. This application also claims priority under 35 U.S.C. §119(e) to U.S. Provisional Application Ser. No. 60/735,617, filed on 12 Nov. 2005, the contents of which are herein incorporated by reference.

BACKGROUND

1. Field of the Invention

The present invention relates to the problem of finding the nearest neighbor to an object in a set of objects. More specifically, the present invention relates to a method and an apparatus for building and querying a parallel hybrid spill tree to facilitate parallel nearest-neighbor matching operations.

2. Related Art

The proliferation of the Internet and digital photography have made large-scale image collections containing billions of images a reality. However, such large-scale image collections are difficult to organize and navigate. One operation that can simplify the task of organizing images is to identify and remove near-duplicate images in a collection. Near-duplicate images of popular items, such as book covers, CD covers, and movie posters, appear frequently on the web, since such items are often scanned or photographed multiple times with varying resolutions and color balances. Efficient and scalable techniques for locating nearest neighbors in the image feature space and clustering them together are helpful for removing such near-duplicates.

Previous work has shown that a variant of metric trees, known as "hybrid spill trees," can be used to efficiently locate approximate nearest neighbors in high-dimensional spaces with high accuracy and speed. However, existing techniques that use this data structure to identify near-duplicates, similar objects, and/or nearest neighbors are designed for a single machine, and consequently do not scale to large-scale collections.

Hence, what is needed is a method and an apparatus that facilitates partitioning parallel nearest-neighbor matching operations without the limitations of the above-described techniques.

SUMMARY

One embodiment of the present invention provides a method and a system for performing a nearest-neighbor matching operation using a parallel. hybrid spill tree. During operation, the system receives an object to be compared to a set of objects stored in the parallel hybrid spill tree. The system first searches a "top tree" of the parallel hybrid spill tree to identify a partition that is likely to contain a nearest neighbor of the object. Each node in the top tree defines an associated partition for the parallel hybrid spill tree. The system then searches a "leaf sub-tree" of the parallel hybrid spill tree that corresponds to the associated partition in an attempt to identify the nearest neighbor of the object.

In a variation on this embodiment, the system maintains each leaf sub-tree on a separate server to facilitate parallel operations on the parallel hybrid spill tree.

In a further variation, the system searches the top tree to identify multiple leaf sub-trees that are likely to contain the nearest neighbor of the object. The system proceeds to search each leaf sub-tree searches occur in parallel on separate servers. When the searches are complete, the system combines the results to determine the nearest neighbor for the object.

In a further variation, the system replicates the top tree on multiple separate servers. As a result, when the system receives a set of multiple objects, the system can split the multiple objects across multiple separate servers to facilitate parallel operations for the objects.

In a further variation, the system adjusts an overlap window for a hybrid spill tree in the parallel hybrid spill tree to change the parallel behavior of the parallel hybrid spill tree. For instance, when processing a query on a top tree, a narrower overlap window results in less object duplication at the cost of additional leaf sub-tree searches, while a wider overlap window results in higher object duplication as a cost of reducing the number of leaf sub-tree searches.

In a variation on this embodiment, the system determines a set of multiple nearest neighbor objects for a given object.

In a variation on this embodiment, the system uses nearest-neighbor matching operations to cluster the set of objects stored in the parallel hybrid spill tree.

In a variation on this embodiment, each object in the set of objects includes a feature vector. A search for a given object returns the nearest neighbors to the given object based on similarities between the corresponding feature vectors.

In a further variation, the system uses the method to determine similarities and/or duplication between objects that include images, documents, products, three-dimensional models, music, pornographic materials, unsolicited email or documents ("spam"), books, and video.

BRIEF DESCRIPTION OF THE FIGURES

FIG. 1A illustrates a two-dimensional k-D partitioning of a set of objects in accordance with an embodiment of the present invention.

FIG. 1B illustrates a partitioning using a two-dimensional metric tree in accordance with an embodiment of the present invention. p

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Nearest-Neighbor Search

Nearest-neighbor searching is a sub-problem in many machine learning and clustering techniques. Solving this problem typically involves comparing "feature vectors" for objects. A feature vector describes the features of each object as a multi-dimensional vector. Given a new object's features, the goal is to find an existing object in the object space that has the closest feature vector according to some distance measure, such as Euclidean distance. Over the years, techniques for solving the nearest-neighbor problem have evolved from performing a linear search of all objects, to using k-dimensional (k-D) trees which specify axis-parallel partitions of the data, to metric trees (or ball trees) which split the data with arbitrary hyperplanes, and most recently to spill trees.

FIG. 1A illustrates an example of a two-dimensional k-D partitioning, in which all of the partition boundaries are parallel to the x- and y-axes. FIG. 1B illustrates a partitioning using a two-dimensional metric tree, which differs from a k-D tree in that the partition boundaries can be arbitrary hyperplanes that are no longer parallel to the axes. Note that k-D trees are a subset of metric trees.

Figure 1C:
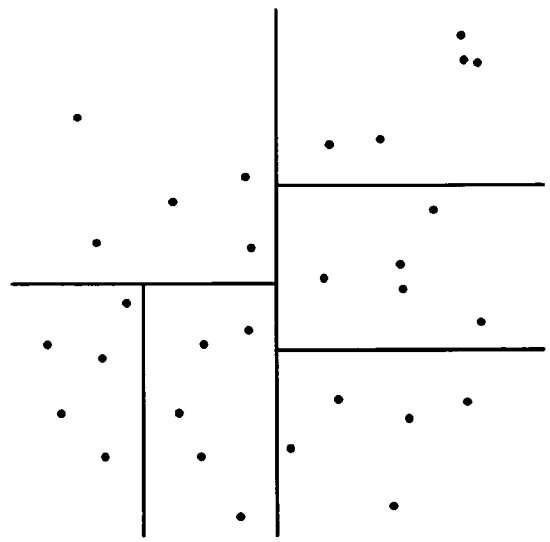
FIG. 1C illustrates partitioning using a spill tree in accordance with an embodiment of the present invention.
Figure 1C:
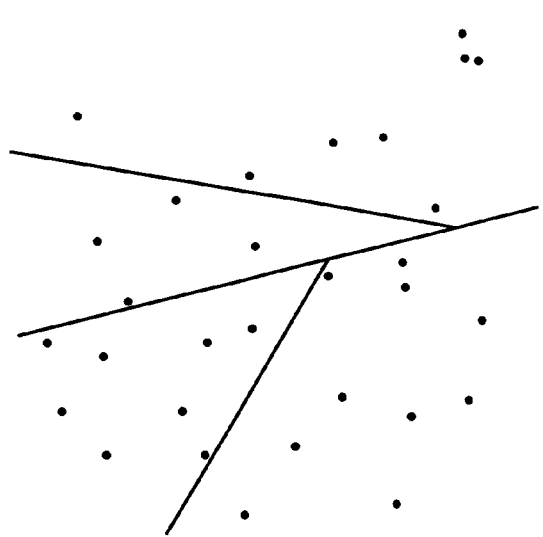
Figure 1C:
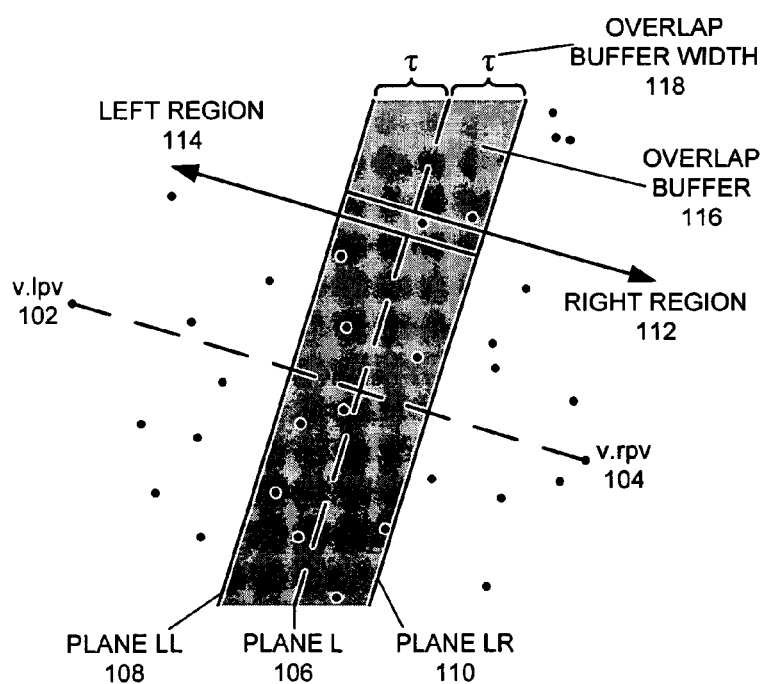

FIG. 1C illustrates a partitioning using a spill tree. A spill tree is a variant of a metric tree that supports efficient approximate nearest-neighbor (NN) searches. Unlike metric trees, the children of a spill tree node can share objects. Let N(v) denote the set of objects represented by a node v, and v.lc and v.rc denote the left child and the right child of the node v. Two pivot points, v.lpv 102 and v.rpv 104, are used to find a decision boundary plane L 106. The partition procedure for a metric tree would imply that the point sets of v.lc and v.rc would be disjoint, separated by the decision boundary plane L 106 shown in FIG. 1C. In a spill tree, however, the splitting criteria are relaxed to allow overlaps between two children. The system defines two new separating planes, plane LL 108 and plane LR 110, which are parallel to plane L 106 and at distance $\tau$ from plane L 106. All of the objects to the right of plane LL 108 belong to the child v.rc and the right region 112, and all of the objects to the left of the plane LR 110 belong to the child v.lc and the left region 114. The point sets v.lc and v.rc share all of the objects that fall in the region between plane LL 108 and plane LR 110. This region is called the overlap buffer 116, and the distance $\tau$ is called the overlap buffer width 118.

A spill-tree-based k-NN search is a defeatist search, where the system descends the tree quickly using the decision boundaries at each level without backtracking. In practice, hybrid spill trees are typically used. Hybrid spill trees are a combination of spill trees and metric trees, where the system decides at each node whether to use an overlapping node or non-overlapping node. The system only uses defeatist search on overlapping nodes, instead using conventional backtracking techniques for metric tree nodes. Note that $\tau$ is a critical parameter for both tree generation and search, since generally, the greater the value of $\tau$, the more accurate but also slower the search technique becomes.

The above-described techniques are performed serially, on a single machine that has random access to the entire set of objects to be placed in the tree. The present invention extends these techniques to facilitate parallel operation across multiple machines to handle large data sets that cannot fit into a single computer's memory. The following specification describes how to build a parallel hybrid spill tree that allows the system to handle a large number of queries efficiently in parallel, as well as automatically set the overlap buffer size.

As mentioned previously, the nodes illustrated in the trees described may represent an object using a feature vector. Before building a search tree, the system may first need to transform the objects into a feature vector representation. In one embodiment of the present invention, the system creates feature vectors for a set of images by first normalizing an image by scaling the maximum value of each color channel to cover the full range of intensities, and then scaling the image to a fixed size of 64×64 pixels. One obvious representation might be the image pixels themselves. However, this would likely be quite sensitive to noise and other small image variations. Therefore, the system instead uses an adaptation of a known technique to convert the image to a Haar wavelet domain, with the wavelet coefficients quantized to ±1, and all but the largest 60 magnitude coefficients simply set to zero. The feature vector as described is quite large, 64×64×3, so the system uses random projection to reduce the dimensionality of the feature vector to 100 dimensions. The system then appends the average of each color channel and the aspect ratio w/(w+h) to this feature vector for a total of 104 dimensions. Note that the nearest-neighbor technique described in the present invention is designed to handle generic feature vectors, and is not restricted to this particular application.

Building Parallel Hybrid Spill Trees for Parallel Nearest-Neighbor Matching

A significant challenge in scaling up traditional hybrid-spill-tree generation is that the system needs to keep all the objects' feature vectors in memory to provide random access. When the number of objects becomes large enough, it is no longer possible to store everything in memory. For instance, if the system uses 104 floating-point numbers, or roughly 416 bytes, to represent each object, two million points could fit comfortably on a machine with 1 GB of memory. For this example, a collection of over a billion images contains nearly five hundred times as much feature vector data as can fit on one machine.

One way to partition the data set might be to randomly partition the data, building a separate hybrid spill tree for each partition. However, at query time, this would require each query to run through all of the trees. While this query could execute in parallel, the overall query throughput would be limited.

One embodiment of the present invention produces a more intelligent partitioning of the data by using a metric tree structure. First, the system creates a random data sample small enough to fit on a single machine (let 1/M=the fraction of the data that would fit on a single machine), and builds a metric tree for this data. Each of the leaf nodes in this "top tree" then defines a partition for which the system builds a hybrid spill tree on a separate machine. The overall tree, consisting of the top tree along with all the "leaf sub-trees," can be viewed conceptually as a single hybrid spill tree that spans a large number of machines. By splitting the tree across the multiple leaf sub-trees, the system keeps more feature vectors in memory, thereby increasing system scale to encompass arbitrarily large sets of objects, given sufficient servers.

While the embodiment of the present invention described above structures the top tree as a metric tree, another embodiment structures the top tree as a spill tree. When the top tree is a spill tree, the system avoids the need to backtrack during search, thereby avoiding the need to search multiple leaf sub-trees. However, a negative aspect of spill trees is that objects appear in multiple leaf sub-trees. As a result, using a spill tree for the top tree can lead to a significant increase in the total storage required by the system. The techniques described in the following description use a metric tree for the top tree.

When building the top-level metric tree, the system needs a stopping condition for the leaves. Typically, the tree-building algorithm defines the stopping condition as an upper bound on the leaf size. In one embodiment of the present invention, the system sets the upper bound U such that the expected number of objects U·M that will fall into a single leaf sub-tree can fit on a single machine. The system can set U·M a factor of two or more smaller than the actual limit, to allow for variability in the actual number of objects partitioned into each leaf. The system can additionally set a lower bound L on the number of nodes to prevent individual partitions from being too small.

Figure 2:
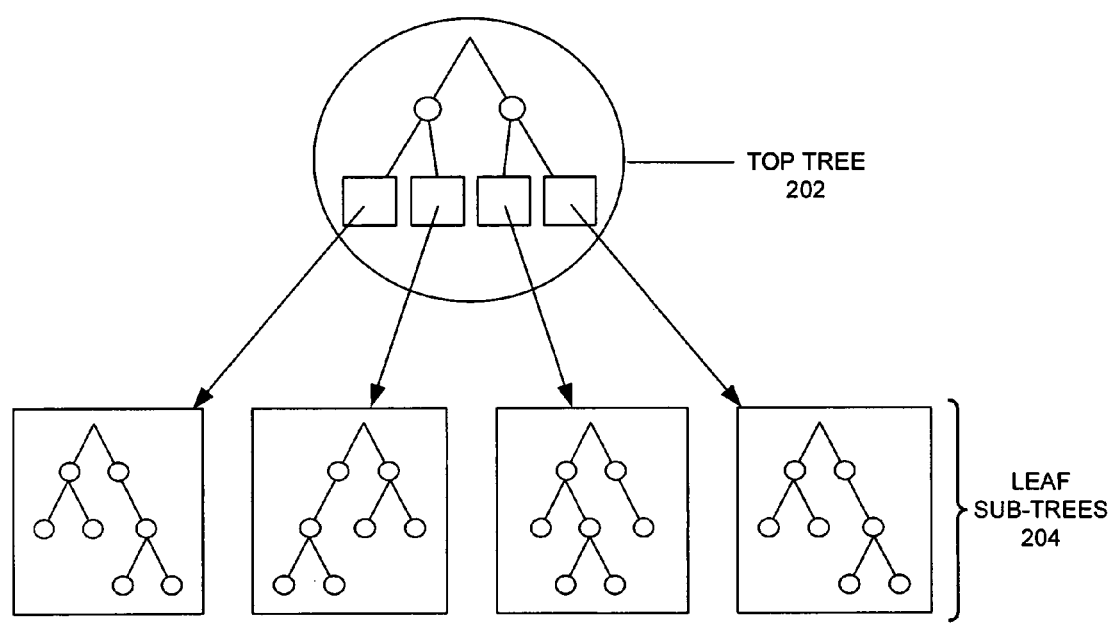
FIG. 2 illustrates a parallel hybrid spill tree in accordance with an embodiment of the present invention.
Figure 3:
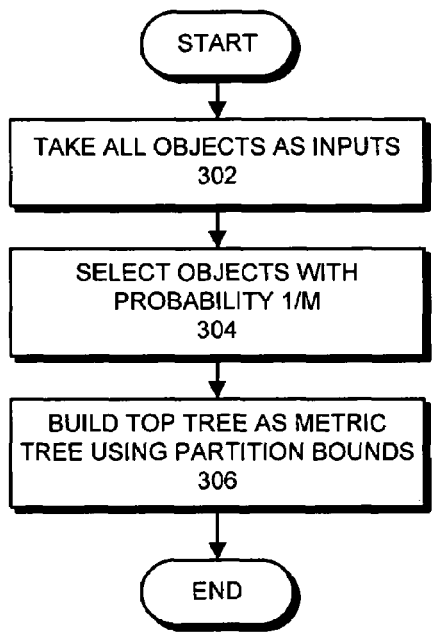
FIG. 3 presents a flow chart illustrating the process of building a top tree in accordance with an embodiment of the present invention.

FIG. 2 illustrates a parallel hybrid spill tree in which the top tree 202 and each of the leaf sub-trees 204 are located on different machines. FIG. 3 presents a flow chart illustrating the process of building a top tree. This procedure takes all of the objects in a collection as an input (step 302), and selects objects with probability 1/M (step 304). The system then uses the selected output objects to build the top tree as a metric tree using a set of partition bounds (step 306).

Figure 4:
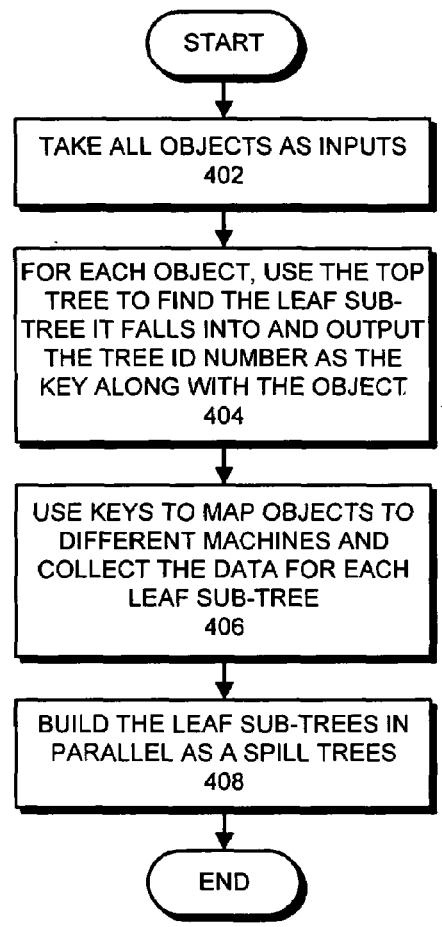
FIG. 4 presents a flow chart illustrating the process of partitioning input objects and creating the leaf sub-trees of the parallel hybrid spill tree in accordance with an embodiment of the present invention.

FIG. 4 presents a flow chart illustrating the process of partitioning the input objects and creating the leaf sub-trees of the parallel hybrid spill tree. The system takes all of the objects in the collection as input (step 402), and then proceeds to use the top tree to find the leaf sub-tree that each object falls into (step 404). As a result of this procedure, each object is associated with a distinct key corresponding to a distinct leaf sub-tree. The system uses this distinct key to map the objects to the different machines, so that each machine can collect the data for its corresponding leaf sub-tree (step 406). After the system partitions the objects, the machines build their respective leaf sub-trees in parallel as spill trees (step 408). Each leaf sub-tree decides for each node in its partition whether to use a spill tree with overlap or a metric tree, based on how many objects fall into the overlap buffer regions.

Note that the system can replicate the top tree on multiple servers to parallelize the partitioning procedure.

Querying Parallel Hybrid Spill Trees for Parallel Nearest-Neighbor Matching

After the system builds the parallel hybrid spill tree, it can query it in nearest-neighbor matching operations. As mentioned earlier, the top tree together with the leaf sub-trees can be viewed as one large hybrid spill tree. The normal way to query a spill tree allows for backtracking through non-overlapping nodes, such as those that appear in the top tree, whenever a partition boundary is found to be closer to the queried object than the nearest neighbor found in the current partition. However, such an approach would be expensive to implement for a parallel hybrid spill tree, since the entire tree is not stored on a single machine. Instead, in one embodiment, the system speculatively sends each query object to multiple leaf sub-trees when the query object is close enough to the partition boundary. This effectively provides a run-time version of the overlap buffer, which was previously only applied at tree building time. The benefit of this technique is that fewer machines are required to hold the leaf sub-trees (because there is no duplication of objects across the sub-trees), but with the expense that the system may send each query to several leaf sub-trees during search. In practice, the system can adjust the overlap buffer size to control the amount of computation done at query time.

Figure 5:
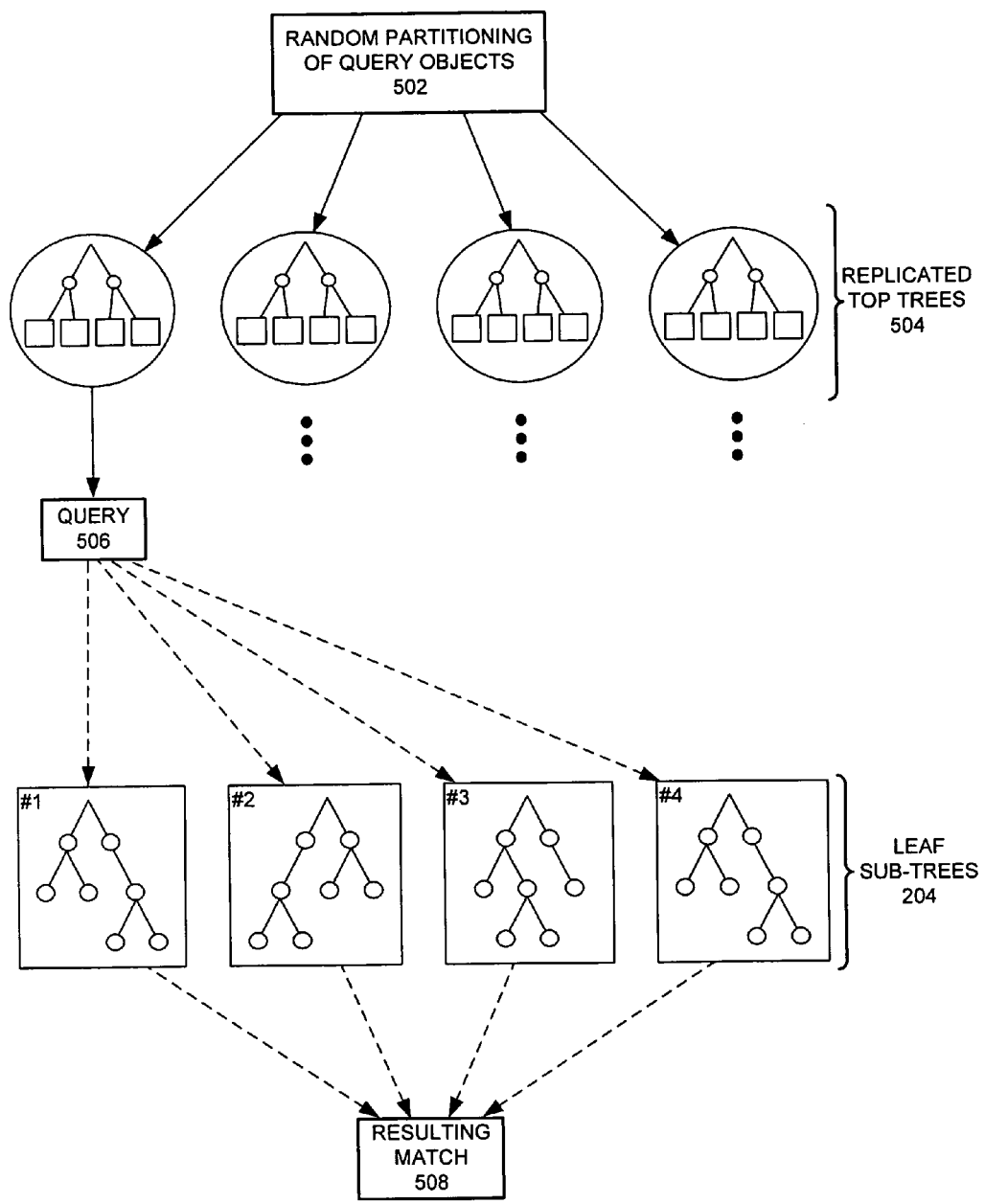
FIG. 5 illustrates the processing of a query into a parallel hybrid spill tree which includes a replicated top tree in accordance with an embodiment of the present invention.
Figure 6:
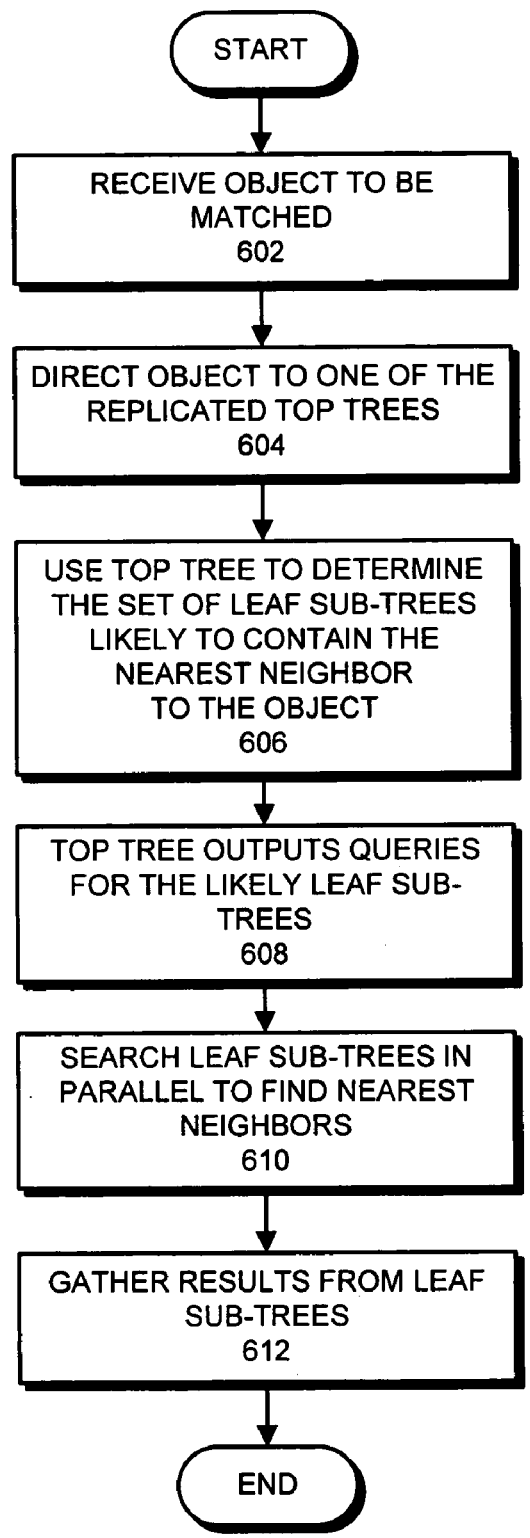
FIG. 6 presents a flow chart illustrating the process of querying of a parallel hybrid spill tree in accordance with an embodiment of the present invention.

FIG. 5 illustrates a query into a parallel hybrid spill tree with replicated top trees in accordance with an embodiment of the present invention. FIG. 6 presents a corresponding flow chart illustrating the querying of the parallel hybrid spill tree. First, an object to be matched is received (step 602). The system randomly directs this object 502 to one of the replicated top trees 504 (step 604), which then determines the set of leaf sub-trees that might contain the nearest neighbor to the object (step 606). The top tree outputs the object as a query 506 to the likely leaf sub-trees (step 608), which are then searched in parallel to find the respective nearest neighbor in each partition (step 610). Finally, if more than one leaf sub-leaf was involved in the query, the system gathers the results to determine the resulting match 508 (step 612).

The system can exploit replicated top trees and parallel searches for objects across leaf sub-trees stored on different machines to dramatically increase the number of simultaneous parallel queries. Note that the system can also replicate leaf sub-trees, if necessary, to further increase the parallelization or redundancy of the matching operations.

Note that the techniques in the present invention can be applied to determine similarities and/or duplication between any set of objects that can be described as feature vectors, including images, documents, products, three-dimensional models, music, pornographic materials, unsolicited email or documents ("spam"), books, and video. The methods to build and query parallel hybrid spill trees can be used, but are not limited, to determining similarity and/or duplication in fraud detection, fingerprint recognition, face recognition, optical character recognition, product search, data clustering, language detection, machine learning and classification problems, a search through SIFT descriptors, or a recommendation engine for products.

Data Clustering

Figure 7:
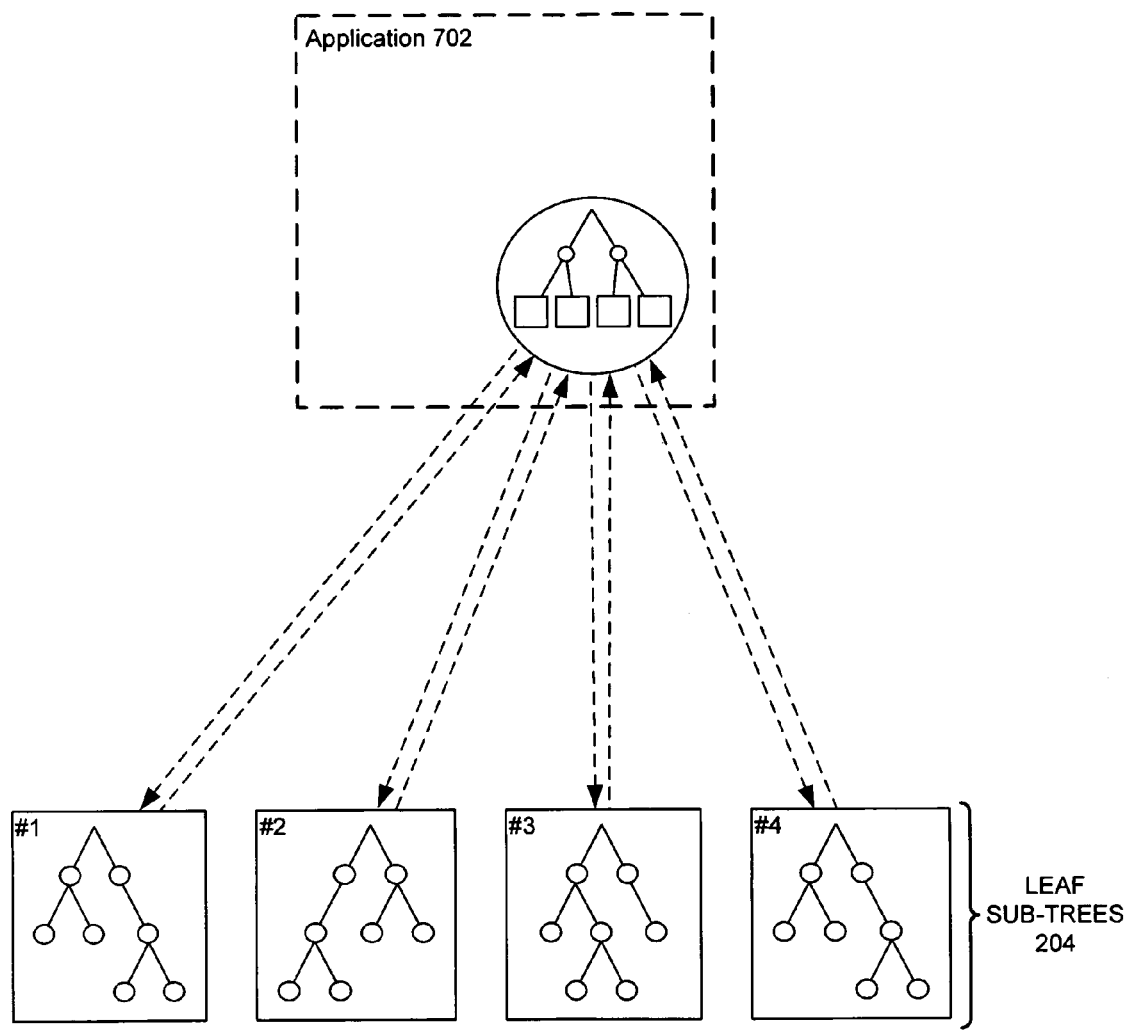
FIG. 7 illustrates an application that performs on-line nearest-neighbor matching operations in accordance with an embodiment of the present invention.

The system described in the present invention can perform nearest-neighbor matching operations in both an on-line mode, in which the system receives a query object and proceeds to find the nearest neighbor, or in an off-line (batch) mode, in which the nearest neighbors are found for every point in a collection. Since the system may need many machines to efficiently query a large collection of objects, the query system can in one embodiment be arranged as a "nearest-neighbor service" which accepts a query and returns the closest neighbors. In this configuration, one or more machines contain the top tree, and direct the query to one or more leaf machines. The top tree(s) may be located on a different machine from the client (as is typical of services), or may be located on the same machine, perhaps even in the same process. One application of such a service is an image retrieval application. FIG. 7 illustrates an example of an on-line application 702 that incorporates the top tree and sends out queries directly to a set of leaf sub-trees 204.

The system described is not restricted to nearest-neighbor matches, and can be set to find the n nearest matches to an object. A sample application in which the system searches for n nearest-neighbor matches is data clustering, a batch process during which the system finds the n nearest neighbors for every object in the parallel hybrid spill tree.

Figure 8:
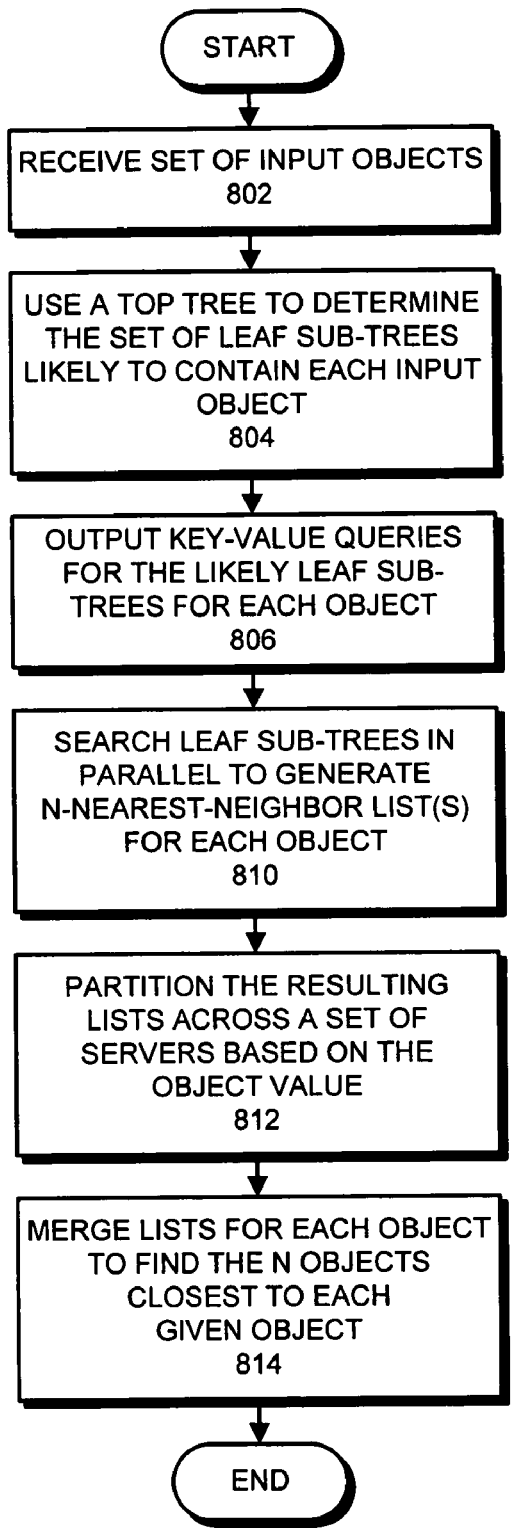
FIG. 8 presents a flow chart illustrating data clustering using nearest-neighbor matching in accordance with an embodiment of the present invention.

FIG. 8 presents a flow chart illustrating data clustering using nearest-neighbor matching. The system first receives a set of input objects (step 802), which in this example is the set of objects in the parallel hybrid spill tree. For each input object, the system uses the top tree to determine which leaf sub-tree(s) the object falls into (step 804). At each node in the top tree, the system may send the input object down both sides of the tree if it falls within the overlap buffer width of the decision plane. The system generates a key-value query pair for each leaf sub-tree to be searched for the n nearest neighbors (step 806), and proceeds to search the hybrid-spill-trees for each query routed to a leaf sub-tree, generating a set of n-nearest-neighbor lists for each participating leaf sub-tree (step 810). The system then partitions the objects and their resulting lists across a set of servers based on each individual object's key value (step 812). Finally, the system merges the lists in parallel to find the final n nearest neighbors for each object (step 814).

Note that the system can apply a threshold distance as a practical step during the clustering procedure, to drop nearest neighbor images that are considered too far apart to be members of the same cluster.

Parameter Estimation

As mentioned previously, one of the important parameters for spill tree generation and search is the "overlap buffer width." The overlap buffer width should ideally be large enough to always include the n nearest neighbors of a point, to guarantee that these neighbors will always be found. However, a smaller value may be acceptable if the system is able to tolerate a certain number of errors. One embodiment of the present invention includes a way to estimate the ideal overlap buffer size, which is then relaxed in practice (by making the buffer smaller) to improve speed.

To estimate the overlap buffer size, the system first estimates $R_S$, the average distance (averaged over the objects in set S) to their nearest neighbors. If we make the approximation that points are uniformly distributed, the number of objects falling within a certain radius of a given object should be proportional to the density of the objects (which is in turn proportional to the number of samples $N_S$) raised to the power of the dimensionality of the manifold d on which the points are distributed. In particular, if the expected number of points is fixed to 1, then the radius of interest is $R_S$, giving the following equation:

$$1 \propto N_S \cdot R_S^d. \qquad \text{(Equation 1)}$$

Isolating $R_S$ gives the following relationship, introducing a proportionality constant c:

$$R_S = \frac{c}{N_S^{1/d}}. \qquad \text{(Equation 2)}$$

To compute $R_S$ for the whole set of objects $S_{all}$, the system first needs to estimate the constant c and the effective dimensionality d. The system can estimate these by generating a number of different sized subsets of the data, e.g. typically between 20 and 500 samples. For each of these sets, the system finds the nearest neighbor of each point by computing all $N_S^2$ distances, and recording the average distance to the nearest neighbor of each point. Taking the log of both sides of Equation 2 allows c and d to be estimated using standard linear regression methods. Plugging these values along with the full sample set size into Equation 2 provides an estimate of the average nearest-neighbor distance over the whole set.

In one embodiment of the present invention the system sets the overlap buffer size to $R_S$. However, in another embodiment the system takes into account that the partition hyperplanes are unlikely to be perpendicular to the vector between objects which are $R_S$ apart. According to the Johnson-Lindenstrauss lemma, after randomly projecting a point from the effective dimensionality d of the samples down to the one dimensional space normal to the partitioning hyperplane, the expected distance will be:

$$2\tau = \frac{R_S}{\sqrt{d}}. \qquad \text{(Equation 3)}$$

Equation 3 yields an estimate of the overlapping buffer size. As mentioned earlier, the system typically chooses a smaller value for the overlap buffer than what is computed above for greater efficiency, but the above procedure provides an efficient method to get close to the right value.

Note that using parallel hybrid spill trees for parallel nearest-neighbor matching is in part appealing because of the relatively small set of parameters that the system needs to tune for different domains. This reduced tuning results in improved efficiency over other techniques that require more elaborate tuning, such as locality-sensitive hashing.

One embodiment of the present invention further tunes the partition bounds when building the top tree, to alleviate a potential bottleneck caused by the fact that the number of objects in each leaf sub-tree is not controlled precisely, but only approximately by the lower bound L and the upper bound U. Since the system builds the top tree using a small sample of the data, the top-tree approximation will have errors. An alternative procedure builds the top tree with a stopping condition of a single object per leaf node. After doing this, the system runs all of the objects through the tree, and records counts for how often an object reaches each leaf node. The system then uses this information to prune back the top tree until the nodes are within a desired size range, thereby controlling the sub-problem more precisely.

In summary, the present invention describes a method for building and querying distributed parallel hybrid spill trees for efficient online or batch searches for the nearest neighbors of points in high-dimension space. These techniques provide improved scalability and performance by allowing a system to leverage additional servers for nearest-neighbor match.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a nearest-neighbor matching operation using a tree data structure, comprising:

receiving the tree data structure, where the tree data structure comprises decision nodes and leaf nodes;

wherein the decision nodes logically partition a set of objects stored in two or more computing devices;

wherein a given decision node defines a partition boundary between two subsets of the set of objects;
wherein a given leaf node corresponds to the objects stored on a given computing device;
receiving a target object for which a nearest neighbor is to be found in the set of objects;
determining one or more leaf nodes associated with the target object by traversing the decision nodes, starting from the top node, of the tree data structure;
wherein a first leaf node corresponds to a first subset of objects;
wherein a second leaf node corresponds to a second subset of objects;
wherein the first subset and the second subset may include overlapping objects that are in proximity to a partition boundary between the first subset and the second subset, wherein the partition boundary corresponds to a decision node that is the parent of the first and second leaf nodes;
when the first subset and the second subset include the set of overlapping objects, searching for a nearest neighbor for the target object in either the first or second subset, based on the partition boundary corresponding to the decision node; and
when the first subset and the second subset do not include the set of overlapping objects and the target object is in proximity to the partition boundary, searching for a nearest neighbor for the target object in both the first and second subsets.

2. The method of claim 1,
wherein the decision nodes and leaf nodes of the tree data structure form a "top tree" that is used to determine the set of computing devices storing nearest-neighbor candidates for the target object; and
wherein the method further comprises maintaining the top tree and the objects stored on the given computing device on a separate computing device to facilitate parallel operations on the tree data structure.

3. The method of claim 2, wherein the method further comprises:
searching the top tree to identify subsets of objects which are likely to contain the nearest neighbor of the target object;
searching subsets of objects which are likely to contain the nearest neighbor of the target object;
wherein the multiple subset searches occur in parallel on separate computing devices; and
combining the results from the multiple subset searches to determine the nearest neighbor for the target object.

4. The method of claim 3, wherein the method further comprises:
replicating the top tree on multiple separate computing devices;
receiving a set of multiple target objects; and
splitting the multiple objects across the multiple separate computing devices to facilitate parallel operations for the multiple target objects.

5. The method of claim 1, wherein the method further comprises determining for the target object a set of multiple nearest neighbor objects.

6. The method of claim 1, wherein the nearest-neighbor matching operations are used to cluster the set of objects stored in the tree data structure.

7. The method of claim 1,
wherein each object in the set of objects includes a feature vector; and
wherein a search for a given object returns nearest neighbors to the given object based on similarities between the corresponding feature vectors.

8. The method of claim 7, wherein the method is used to determine similarities and/or duplication between objects that may include but are not limited to:
images;
documents;
products;
three-dimensional models;
music;
pornographic materials;
unsolicited email or documents ("spam");
books; and
video.

9. A computer-readable storage medium storing instructions that when executed by a computer cause the computer to perform a method for performing a nearest-neighbor matching operation using a tree data structure, the method comprising:
receiving the tree data structure, where the tree data structure comprises decision nodes and leaf nodes;
wherein the decision nodes logically partition a set of objects stored in two or more computing devices;
wherein a given decision node defines a partition boundary between two subsets of the set of objects;
wherein a given leaf node corresponds to the objects stored on a given computing device;
receiving a target object for which a nearest neighbor is to be found in the set of objects;
determining one or more leaf nodes associated with the target object by traversing the decision nodes, starting from the top node, of the tree data structure;
wherein a first leaf node corresponds to a first subset of objects;
wherein a second leaf node corresponds to a second subset of objects;
wherein the first subset and the second subset may include overlapping objects that are in proximity to a partition boundary between the first subset and the second subset, wherein the partition boundary corresponds to a decision node that is the parent of the first and second leaf nodes;
when the first subset and the second subset include the set of overlapping objects, searching for a nearest neighbor for the target object in either the first or second subset, based on the partition boundary corresponding to the decision node; and
when the first subset and the second subset do not include the set of overlapping objects and the target object is in proximity to the partition boundary, searching for a nearest neighbor for the target object in both the first and second subsets.

10. The computer-readable storage medium of claim 9,
wherein the decision nodes and leaf nodes of the tree data structure form a "top tree" that is used to determine the set of computing devices storing nearest-neighbor candidates for the target object; and
wherein the method further comprises maintaining the top tree and the objects stored on the given computing device on a separate computing device to facilitate parallel operations on the tree data structure.

11. The computer-readable storage medium of claim 10, wherein the method further comprises:
searching the top tree to identify subsets of objects which are likely to contain the nearest neighbor of the target object;

searching subsets of objects which are likely to contain the nearest neighbor of the target object;

wherein the multiple subset searches occur in parallel on separate computing devices; and combining the results from the multiple subset searches to determine the nearest neighbor for the target object.

12. The computer-readable storage medium of claim 11, wherein the method further comprises:

replicating the top tree on multiple separate computing devices;

receiving a set of multiple target objects; and splitting the multiple objects across the multiple separate computing devices to facilitate parallel operations for the multiple target objects.

13. The computer-readable storage medium of claim 9, wherein the method further comprises determining for the target object a set of multiple nearest neighbor objects.

14. The computer-readable storage medium of claim 9, wherein the nearest-neighbor matching operations are used to cluster the set of objects stored in the tree data structure.

15. The computer-readable storage medium of claim 9, wherein each object in the set of objects includes a feature vector; and wherein a search for a given object returns nearest neighbors to the given object based on similarities between the corresponding feature vectors.

16. The computer-readable storage medium of claim 15, wherein the method is used to determine similarities and/or duplication between objects that may include but are not limited to:

images;
documents;
products;
three-dimensional models;
music;
pornographic materials;
unsolicited email or documents ("spam");
books; and
video.

17. An apparatus for performing a parallel nearest-neighbor matching operation using a parallel hybrid spill tree, comprising:

a receiving mechanism configured to receive the tree data structure, where the tree data structure comprises decision nodes and leaf nodes;

wherein the decision nodes logically partition a set of objects stored in two or more computing devices;

wherein a given decision node defines a partition boundary between two subsets of the set of objects;

wherein a given leaf node corresponds to the objects stored on a given computing device;

wherein the receiving mechanism is further configured to receive a target object for which a nearest neighbor is to be found in the set of objects;

a determining mechanism configured to determine one or more leaf nodes associated with the target object by traversing the decision nodes, starting from the top node, of the tree data structure;

wherein a first leaf node corresponds to a first subset of objects;

wherein a second leaf node corresponds to a second subset of objects;

wherein the first subset and the second subset may include overlapping objects that are in proximity to a partition boundary between the first subset and the second subset, wherein the partition boundary corresponds to a decision node that is the parent of the first and second leaf nodes;

a searching mechanism configured to search for a nearest neighbor for the target object in either the first or second subset, based on the partition boundary corresponding to the decision node, when the first subset and the second subset include the set of overlapping objects; and wherein the searching mechanism is further configured to search for a nearest neighbor for the target object in both the first and second subsets when the first subset and the second subset do not include the set of overlapping objects and the target object is in proximity to the partition boundary.

18. The apparatus of claim 17, wherein the decision nodes and leaf nodes of the tree data structure form a "top tree" that is used to determine the set of computing devices storing nearest-neighbor candidates for the target object; and where the apparatus further comprises maintaining the top tree and the objects stored on the given computing device on a separate computing device to facilitate parallel operations on the tree data structure.

19. The apparatus of claim 18, wherein the apparatus further comprises:

wherein the searching mechanism is further configured to search the top tree to identify subsets of objects which are likely to contain the nearest neighbor of the target object;

wherein the a search mechanism is further configured to search subsets of objects which are likely to contain the nearest neighbor of the target object;

wherein the multiple subset searches occur in parallel on separate computing devices; and a combination mechanism configured to combine the results from the multiple subset searches to determine the nearest neighbor for the target object.

20. The apparatus of claim 19, wherein the apparatus further comprises:

a replication mechanism configured to replicate the top tree on multiple separate computing devices;

a receiving mechanism further configured to receive a set of multiple target objects; and a splitting mechanism configured to split the multiple objects across the multiple separate computing devices to facilitate parallel operations for the multiple target objects.

* * * * *